(12) United States Patent
Kurita et al.

(10) Patent No.: US 6,336,662 B1
(45) Date of Patent: *Jan. 8, 2002

(54) TONGUE HOOKING MECHANISM FOR SEAT BELT

(75) Inventors: Makoto Kurita; Kouji Kamida; Takahiro Mori, all of Saitama (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,384

(22) Filed: Mar. 19, 1999

(30) Foreign Application Priority Data

Mar. 26, 1998 (JP) .......................................... 10-079546

(51) Int. Cl.⁷ .......................... B60R 22/20; B60R 22/24

(52) U.S. Cl. ..................... 280/801.1; 280/808; 297/483

(58) Field of Search ............................. 280/801.1, 808, 280/806; 297/483, 474, 476, 481, 479, 464; 24/197, 163 R

(56) References Cited

U.S. PATENT DOCUMENTS

| | | | | |
|---|---|---|---|---|
| 3,130,466 A | * | 4/1964 | Carter ........................ | 24/197 |
| 3,243,233 A | * | 3/1966 | Davis ........................ | 297/483 |
| 3,258,293 A | * | 6/1966 | Sharp ........................ | 297/483 |
| 3,401,980 A | * | 9/1968 | Nicholas .................... | 297/483 |
| 3,457,603 A | * | 7/1969 | Romanzi, Jr. et al. ...... | 297/483 |
| 3,583,763 A | * | 6/1971 | Settimi ...................... | 297/474 |
| 4,547,018 A | * | 10/1985 | Cunningham ............ | 280/801.1 |
| 4,993,746 A | * | 2/1991 | Hagelthorn ............... | 280/801.1 |

FOREIGN PATENT DOCUMENTS

| | | | | |
|---|---|---|---|---|
| JP | 53-82930 | 7/1978 | ........... | B60R/21/10 |
| JP | 59-69748 | 5/1984 | ........... | A62B/35/00 |
| JP | 61-18776 | 2/1986 | ........... | B26B/29/02 |
| JP | 61-157047 | 9/1986 | ........... | B60R/22/18 |
| JP | 61-203864 | 12/1986 | ........... | B60R/22/24 |
| JP | 63-98861 | 6/1988 | ........... | B60R/22/26 |
| JP | 63-98862 | 6/1988 | ........... | B60R/22/26 |
| JP | 63-104161 | 7/1988 | ........... | B60R/22/26 |
| JP | 63-104261 | 7/1988 | ........... | B60R/22/12 |
| JP | 1-131662 | 9/1989 | ........... | B60R/22/26 |
| JP | 1-149850 | 10/1989 | ........... | B60R/22/24 |
| JP | 1-149851 | 10/1989 | ........... | B60R/22/24 |
| JP | 5-1580 | 1/1993 | ........... | B60N/2/30 |
| JP | 5-29871 | 4/1993 | ........... | B60R/22/24 |
| JP | 7-38026 | 8/1995 | ........... | B60R/22/24 |
| JP | 8-464 | 3/1996 | ........... | B60R/22/24 |

\* cited by examiner

Primary Examiner—Lanna Mai
Assistant Examiner—Hau Phan
(74) Attorney, Agent, or Firm—Sughrue Mion, PLLC

(57) ABSTRACT

A tongue hooking mechanism for a seat belt incorporating a buckle disposed on a side of a seat adjacent to a central portion of a cabin of a vehicle; a seat belt having a fixed portion formed at an end thereof and disposed on the wall of the cabin; a through anchor portion disposed in an upper portion of the wall and arranged to support an intermediate portion of the seat belt; a retractor disposed below the through anchor portion and outer than the fixed portion and arranged to wind the seat belt up; and a tongue joined to an intermediate portion of the seat belt and arranged to be bitten by the buckle so that the abdomen and the breast of an occupant are held, the tongue hooking mechanism for a seat belt having: a fixing member with which the through anchor portion is joined to the wall, wherein a hook having a claw facing upwards is provided for the fixing member or a cover which covers the fixing member, and the tongue is permitted to be hooked by the hook.

18 Claims, 8 Drawing Sheets

TONGUE HOOKING MECHANISM FOR SEAT BELT

BACKGROUND OF THE INVENTION

1. Field of the Invention

The present invention relates to a tongue hooking mechanism for a seat belt.

2. Description of the Prior Art

A technique has been disclosed in, for example, Japanese Patent Utility Model Unexamined Publication No. Hei. 61-203864. As shown in FIGS. 8 and 9, a conventional seat belt 101 having a tongue hooking mechanism 100 taught by the Publication No. Hei. 61-203864 includes a buckle 107, a seat belt 101, a through anchor portion 103, a retractor 105 and a tongue 106. The buckle 107 is disposed on a side of a seat 102 adjacent to a central portion of a cabin of a vehicle. The seat belt 101 has a fixed portion formed at an end thereof and disposed on the wall of the cabin. The through anchor portion 103 is disposed in an upper portion of the wall and arranged to support an intermediate portion of the seat belt 101. The retractor 105 is disposed below the through anchor portion 103 and arranged to wind-up the seat belt thereon. The tongue 106 is joined to an intermediate portion of the seat belt 101 and arranged to be bitten by the buckle so that the abdomen and the breast of an occupant are held.

In addition to this, a stopper 108 is slidably joined to the belt 101. Moreover, a hooking projection 109 is provided for the stopper 108. When the belt 101 is wound up by a winding unit 105, the stopper 108 is upwards moved to a belt hooking member 103. In the foregoing state, the tongue 106 is hooked by the hooking projection 109 of the stopper 108 so as to suspend the belt 101.

Since the tongue 106 is simply hooked by the hooking projection 109, there is apprehension that the tongue 106 is separated from the hooking projection 109 owing to vibrations of the car body during running.

There is apprehension that vibrations of the car body during running result in the tongue 106 being vibrated and brought into contact with the stopper 108, causing noise to be produced.

SUMMARY OF THE INVENTION

Accordingly, an object of the present invention is to provide a technique which is capable of eliminating the possibility of separation of the tongue during running of a vehicle and vibration of the tongue.

To achieve the above-mentioned object, according to one aspect of the present invention, there is provided a tongue hooking mechanism for a seat belt incorporating a buckle disposed on a side of a seat adjacent to a central portion of a cabin of a vehicle; a seat belt having a fixed portion formed at an end thereof and disposed on the wall of the cabin; a through anchor portion disposed in an upper portion of the wall and arranged to support an intermediate portion of the seat belt; a retractor disposed below the through anchor portion and outer than the fixed portion and arranged to wind the seat belt up; and a tongue joined to an intermediate portion of the seat belt and arranged to be bitten by the buckle so that the abdomen and the breast of an occupant are held, the tongue hooking mechanism for a seat belt comprising: a fixing member with which the through anchor portion is joined to the wall, wherein a hook having a claw facing upwards is provided for the fixing member or a cover which covers the fixing member, and the tongue is permitted to be hooked by the hook.

In the state in which the tongue is hooked by the hook, a tension is applied to the seat belt by the retractor. As a result, the possibility that the tongue is separated from the hook during running can be eliminated. Also the possibility of noise which is produced owing to vibrations of the tongue can be eliminated.

Another aspect of the present invention is characterized in that a recess for receiving the tongue is provided for the fixing member or the cover.

Since the tongue is received in the recess, undesirable projection of the tongue into the cabin space can be prevented.

Another aspect of the present invention is characterized in that an upper wall portion forming the recess is a slant downwardly extending from the central portion of the cabin along the wall.

The tongue is guided or the tongue is separated from the hook along the slant upper wall. Thus, attachment/detachment can easily be performed.

Another aspect of the present invention is characterized in that the lower end of the tongue is positioned upper than the lower end of the through anchor portion in a state in which the tongue is hooked by the hook.

The tension of the seat belt enables the tongue to reliably be pressed against the hook. As a result, the possibility that the tongue is separated from the hook during running can be eliminated. Since vibrations of the tongue can reliably be prevented, a silent state in the cabin can be maintained.

Other objects, features and advantages of the invention will be evident from the following detailed description of the preferred emodiments described in conjunction with the attached drawings.

BRIEF DESCRIPTION OF THE PREFERRED EMBODIMENT

Figure 6:
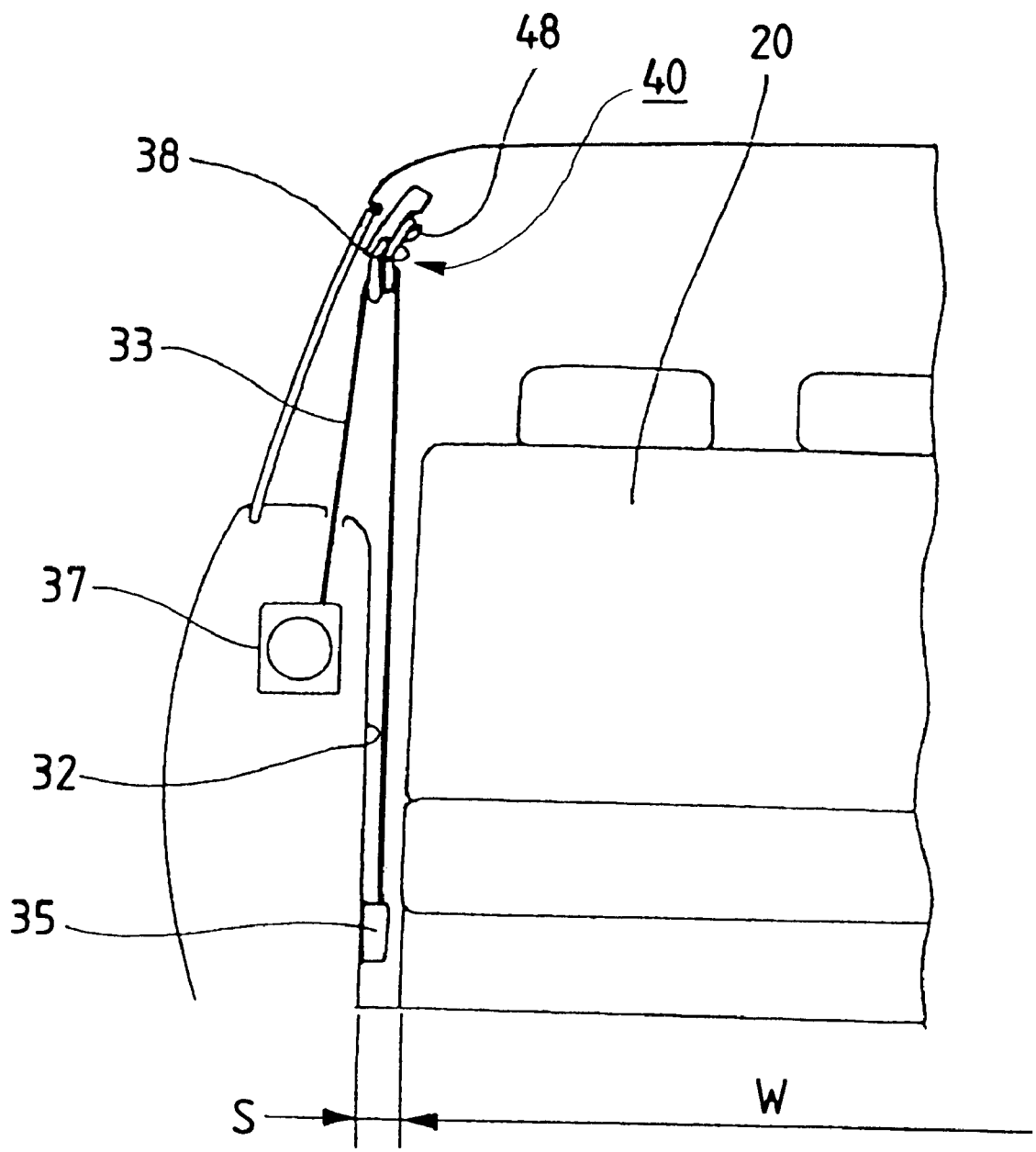
Figure 8:
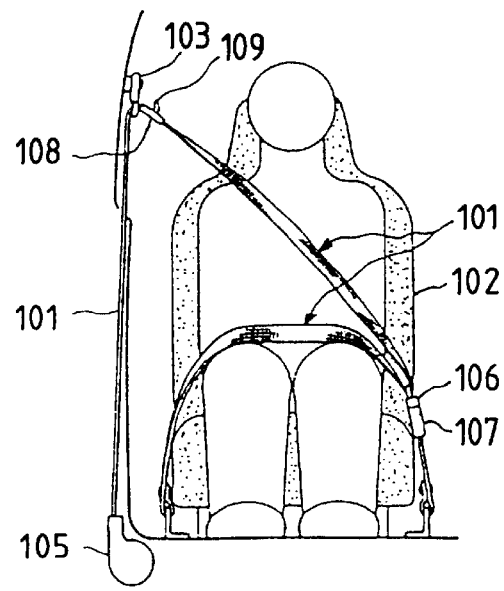
Figure 9:
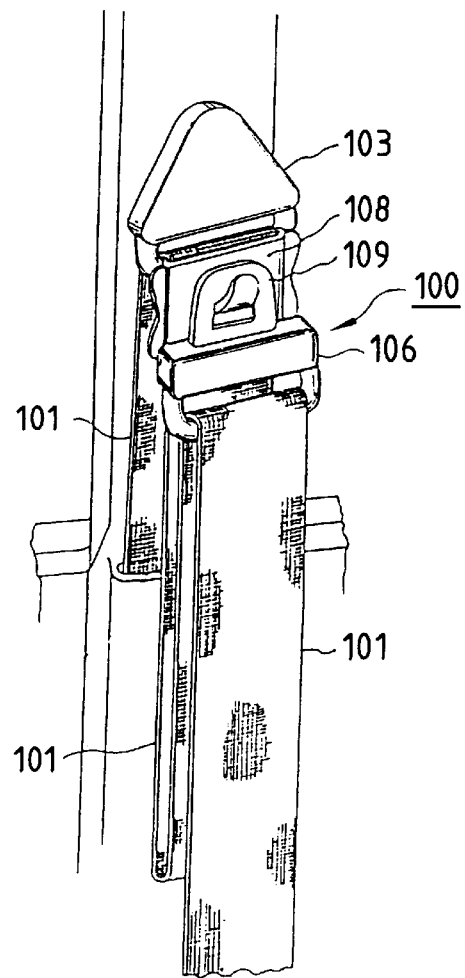

FIGS. 4(*a*)–(*b*) showing a first operation of the tongue hooking mechanism for a seat belt according to the present invention;

FIGS. 5(*a*)–(*b*) showing a second operation of the tongue hooking mechanism for a seat belt according to the present invention;

FIG. 6 is a diagram showing a third operation of the tongue hooking mechanism for a seat belt according to the present invention;

FIGS. 7(*a*)–(*c*) are diagrams showing a fourth operation of the tongue hooking mechanism for a seat belt according to the present invention;

FIG. 8 is a diagram showing an operation of the tongue hooking mechanism for a conventional seat belt; and FIG. 9 shows an enlarged perspective view of the tongue hooking mechanism for the conventional seat belt.

DESCRIPTION OF THE PREFERRED EMBODIMENT

An embodiment of the present invention will now be described with reference to the drawings. Note that the drawings are required to be viewed from a direction of the reference numerals.

Figure 1:
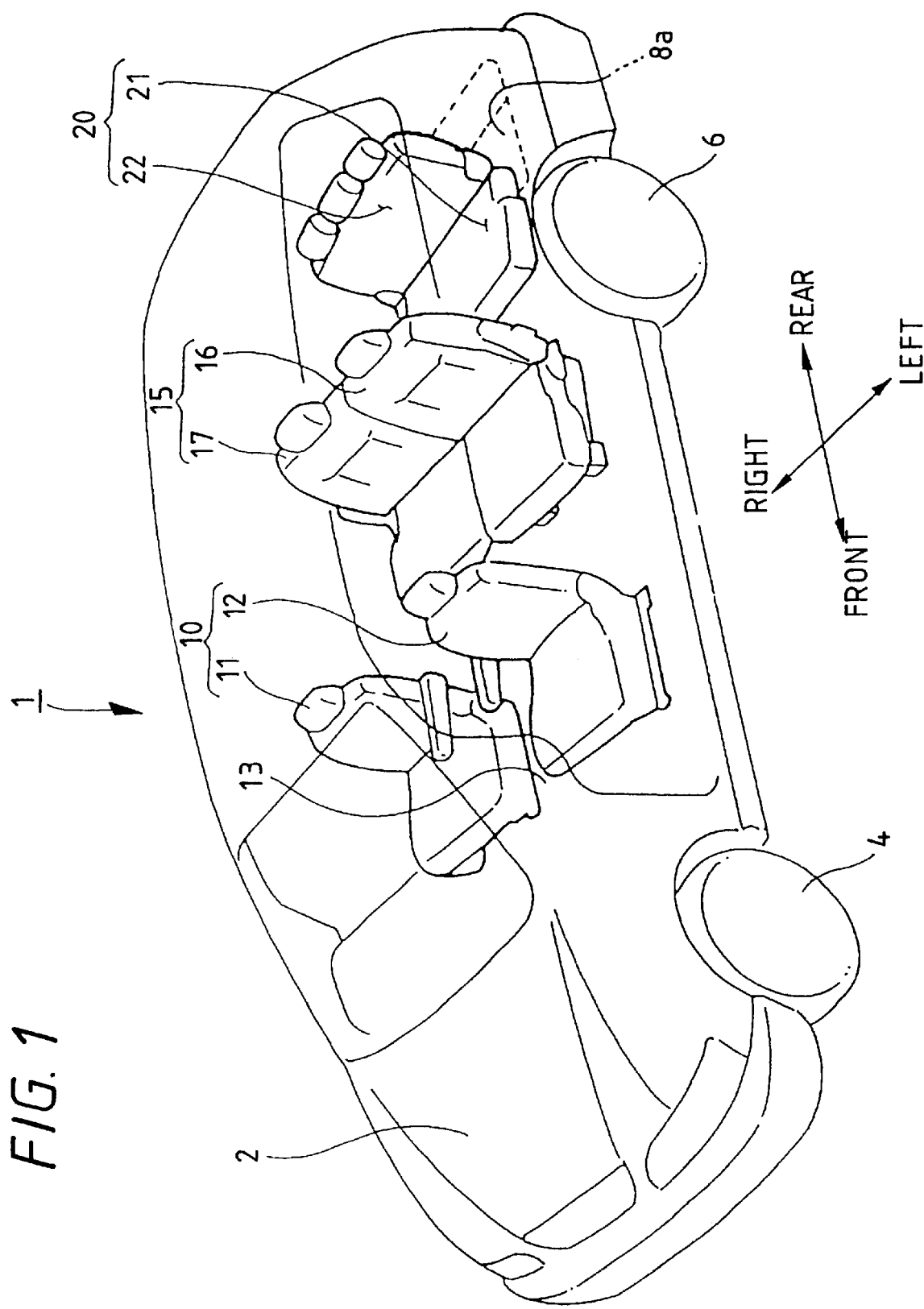
FIG. 1 is a perspective view showing a vehicle incorporating a tongue hooking mechanism for a seat belt according to the present invention.

FIG. 1 is a perspective view showing a vehicle incorporating a tongue hooking mechanism for a seat belt according to the present invention. Hereinafter "right", "left", "front" and "rear" indicate directions or positions when viewed from a driver.

A vehicle 1 is a vehicle (hereinafter called a "mini-van") having an engine (not shown) mounted on the inside portion of a bonnet 2 thereof and having no trunk section. A front seat 10 is disposed on a first line, a second seat 15 is disposed on a second line and a third seat (a seat) 20 is disposed on a third line. Reference numeral 4 represents a front wheel, 6 represents a rear wheel and 8a represents a receiving recess formed in the floor 8. The receiving recess Ba is a recess for receiving the folded third seat 20.

The front seat 10 is composed of a captain seat 11, which is joined to the right-hand portion in the mini-van 1 and adapted to a driver's seat, and a captain seat 12, which is joined to the left-hand portion in the mini-van 1.

The second seat 15 is a separated seat composed of a left-hand second seat 16 and a right-hand second seat 17.

The third seat 20 is a bench seat which can be accommodated in the receiving recess 8a in a state in which the seat cushion 21 and the seat back 22 are folded.

Figure 2:
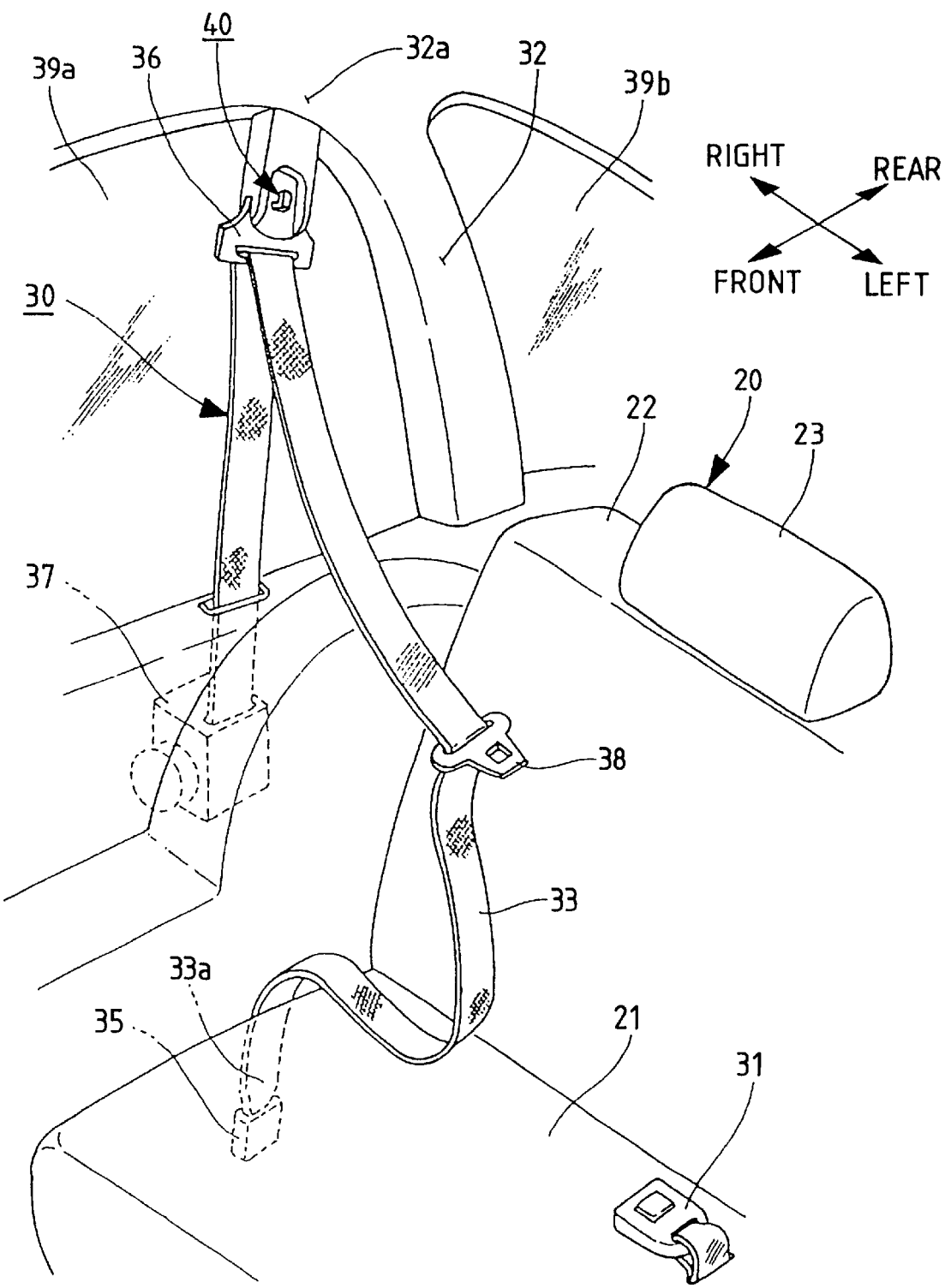
FIG. 2 is a perspective view showing a seat belt apparatus according to the present invention.

FIG. 2 is a perspective view showing a seat belt apparatus according to the present invention such that a state is illustrated in which the apparatus is joined to the right of the third seat 20.

As shown in FIG. 2, a seat belt apparatus 30 incorporates a buckle 31 joined to a portion of the third seat 20 adjacent to the central portion of the cabin; a securing portion 35 which is joined to the right wall (the wall) 32 of the vehicle 1 (see FIG. 1) and to which an end 33a of a seat belt 33 is secured;

a through anchor portion 36 joined to an upper portion 32a of the right wall 32 to support an intermediate portion of the seat belt 33; a retractor 37 joined below the through anchor portion 36 and outer than the securing portion 35 to wind the seat belt 33 up; a tongue 38 joined to an intermediate portion of the seat belt 33; a tongue hooking mechanism 40 of the seat belt 33 joined above the through anchor portion 36.

The tongue 38 is a member which is bitten by the buckle 31 to restrain the abdomen and the breast of an occupant with the seat belt 33.

Reference numeral 23 represents a headrest, 39a represents a quarter glass and 39b represents a tail-gate-window glass.

Figure 3:
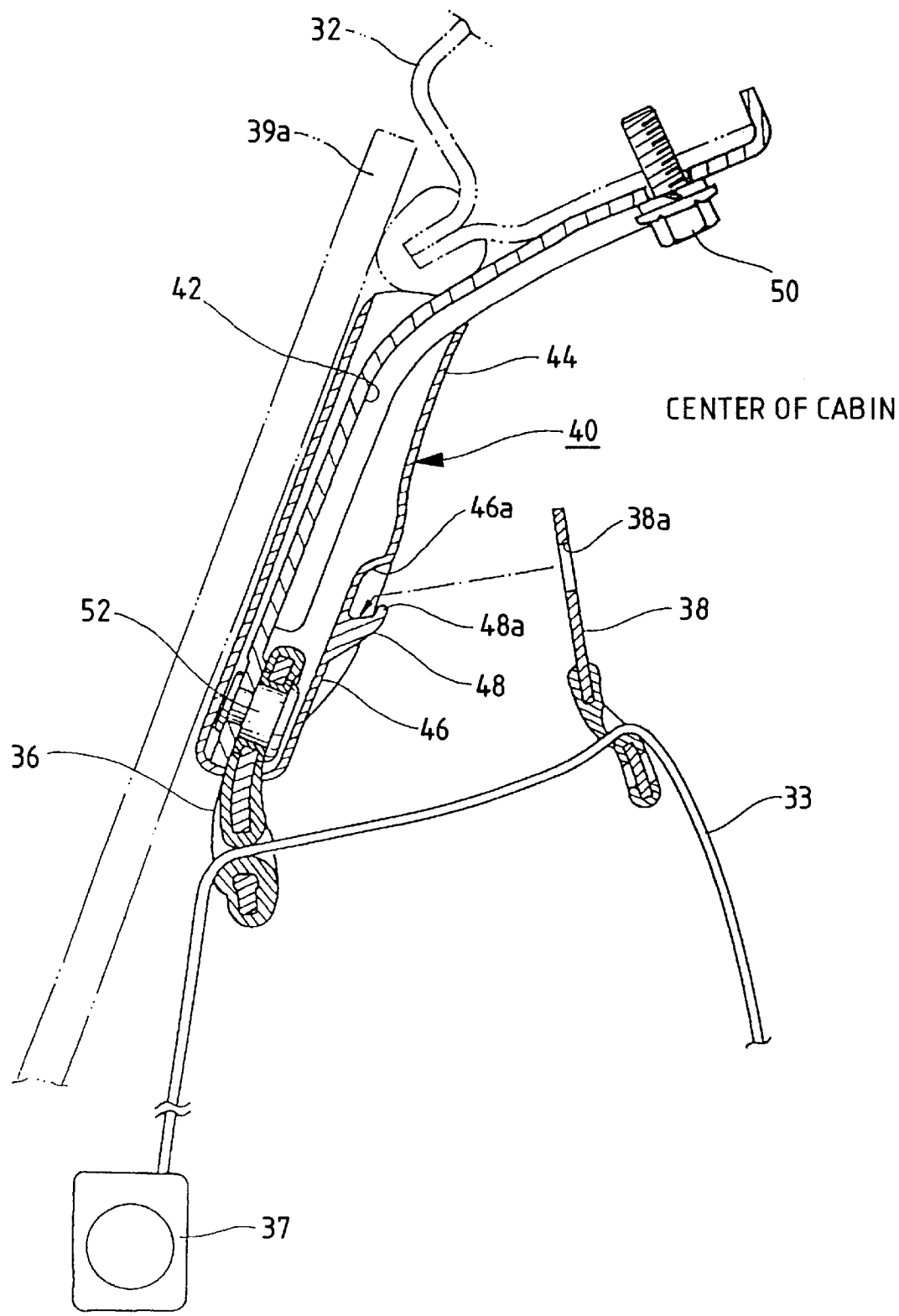
FIG. 3 is a cross sectional view showing the tongue hooking mechanism for a seat belt according to the present invention.

FIG. 3 is a cross sectional view showing a tongue hooking mechanism for a seat belt according to the present invention.

A tongue hooking mechanism 40 for a seat belt has a structure that the through anchor portion 36 is joined to the right wall 32 through a fixing member 42. Moreover, a recess 46 for receiving the tongue 38 is formed in a cover 44 which covers the fixing member 42. A hook 48 having a claw 48a facing upwards is formed in the recess 46. Thus, an opening 38a of the tongue 38 can be hooked by the hook 48.

The recess 46 has an upper wall portion 46a. The upper wall portion 46a is a slant downwardly extending from the central portion of the cabin toward the right wall 32.

Reference numeral 50 represents a bolt for joining the fixing member 42 to the right wall 32, and 52 represents a pin for rotatively joining the through anchor portion 36 to the fixing member 42.

The operation of the foregoing tongue hooking mechanism for a seat belt will now be described.

Figure 4A:
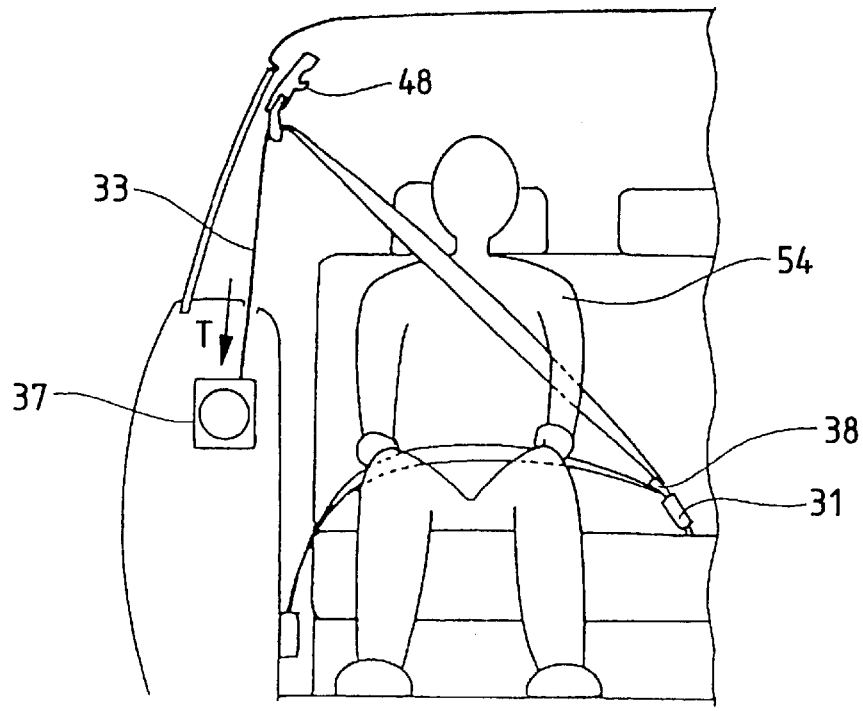
Figure 4B:
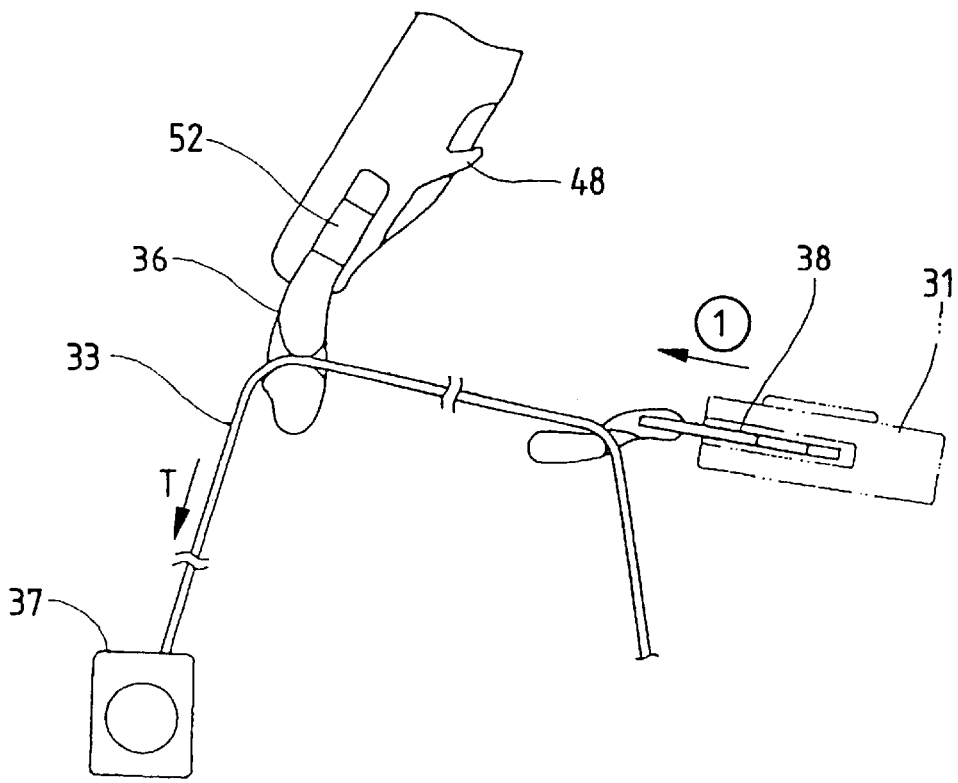

FIGS. 4(a) and 4(b) are diagrams showing a first operation of the tongue hooking mechanism for a seat belt according to the present invention.

Referring to FIG. 4(a), the tongue 38 is bitten by the buckle 31 so that the retractor 37 applies tension T to the seat belt 33, as shown in the drawing, to restrain an occupant 54.

Referring to FIG. 4(b), the state in which the tongue 38 is bitten by the buckle 31 is suspended, followed by moving the tongue 38 as indicated with an arrow (1) so as to be separated from the buckle 31.

Figure 5A:
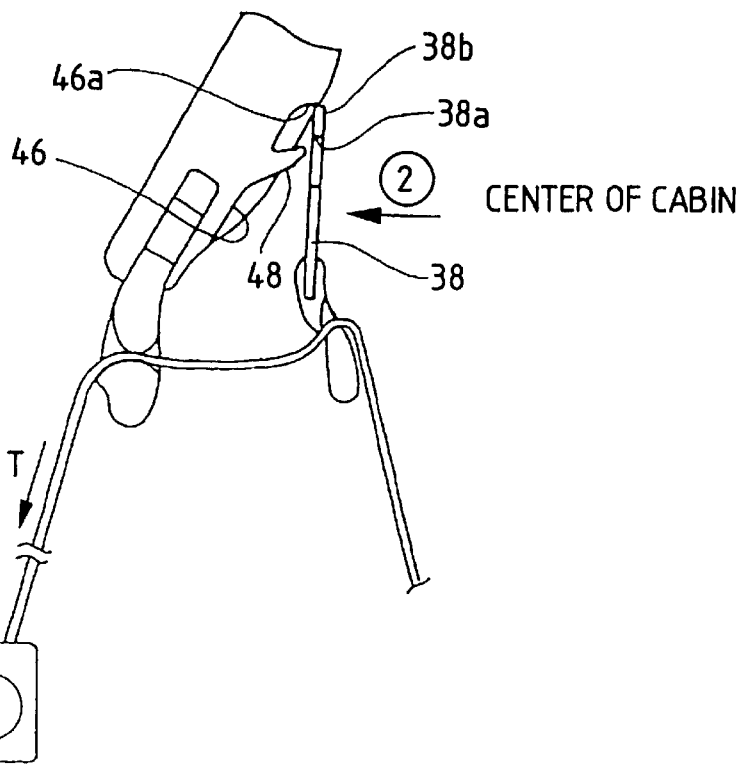
Figure 5B:
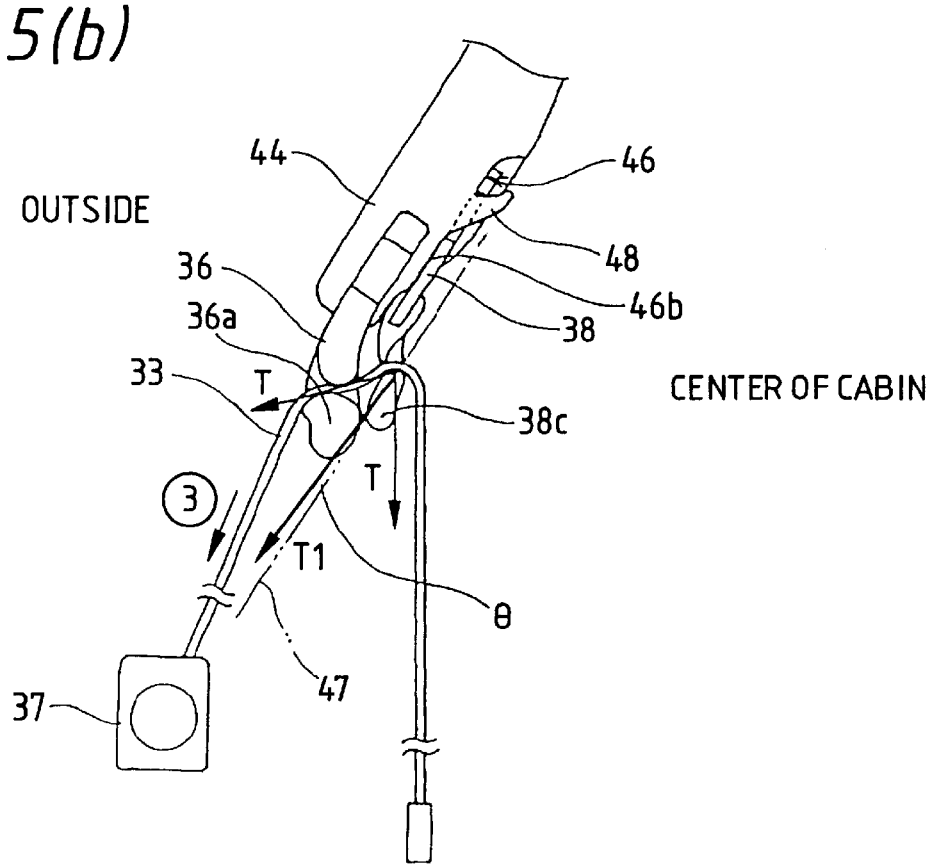

FIGS. 5(a) and 5(b) are diagrams showing a second operation of the tongue hooking mechanism for a seat belt according to the present invention.

Referring to FIG. 5(a), a leading end 38b of the tongue 38 is brought into contact with the upper wall portion 46a of the recess 46 to inwards push the tongue 38 as indicated by an arrow (2). As a result, the tongue can be guided to the hook 48 through the slant upper wall portion 46a. Therefore, the opening 38a of the tongue 38 can be hooked by the hook 48. As a result, the tongue 38 can easily be hooked by the hook 48.

Also in a case where the tongue 38 is separated from the hook 48, the tongue can be separated from the hook along the slant upper wall portion 46a. Therefore, the tongue can easily be separated.

Referring to FIG. 5(b), in a state in which the tongue 38 is hooked by the hook 48, the retractor 37 winds the seat belt 33 up as indicated with an arrow (3) so that the seat belt 33 is stretched without looseness. The tension T of the seat belt 33 generates pressing force T1. The pressing force T1 is outwards (toward the outside from the central portion of the cabin) inclined from a straight line 47 which is in parallel with a bottom surface 46b of the recess 46 by angle θ.

Therefore, the pressing force T1 downwards pulls the tongue 38 while the pressing force T1 is pressing the tongue 38 against the bottom surface 46b of the recess 46.

When the tongue is hooked by the hook, a lower end 38c of the tongue 38 is, at this time, positioned upper than a lower end 36a of the through anchor portion 36 (the lower end 38c of the tongue 38 is not in contact with the lower end 36a of the through anchor portion 36). Therefore, the pressing force T1 is able to reliably press the tongue 38 against the hook 48 and the bottom surface 46b of the recess 46 (that is, floating of the tongue 38 from the hook 48 can be prevented).

As a result, the possibility that the tongue 38 is separated from the hook 48 during running can be eliminated. Since the tongue is not vibrated, noise is not produced. Thus, the inside portion of the cover can be maintained silent.

Since the tongue 38 is not vibrated, durability of components of the tongue hooking mechanism 40 for a seat belt, for example, the cover 44 and the hook 48, can be improved.

Since the recess 46 for receiving the tongue 38 is formed in the cover 44, the tongue 38 can be received in the recess 46 when the tongue 38 has been hooked by the hook 48. Since the tongue 38 is received in the recess 46, undesirable projection of the tongue 38 into the inside portion of the cabin can be prevented. Therefore, the appearance of a state in which the tongue 38 has been hooked by the hook 48 can be enhanced.

FIG. 6 is a diagram showing a third operation of the tongue hooking mechanism for a seat belt according to the present invention.

In general, the width W of the third seat 20 is enlarged maximally. Therefore, a gap S between the right wall 32, which is the inner surface of the car body, and the third seat 20 becomes narrow.

The tongue hooking mechanism 40 for a seat belt according to the present invention has the structure that the tongue 38 is hooked by the hook 48. Thus, the tongue 38 can upwards be moved through the gap between the right wall 32 and the third seat 20.

Therefore, even if the width W of the third seat 20 is enlarged to narrow the gap S, the possibility that the seat belt 33 disposed in the gap S is brought into contact with the third seat 20 can be eliminated.

When the third seat 20 is received in the receiving recess 8a (see FIG. 1) in the floor 8 (see FIG. 1), the seat belt 33 and the tongue 38 do not obstruct the third seat 20.

A method of receiving the third seat 20 will now be described by the following drawings.

Figure 7A:
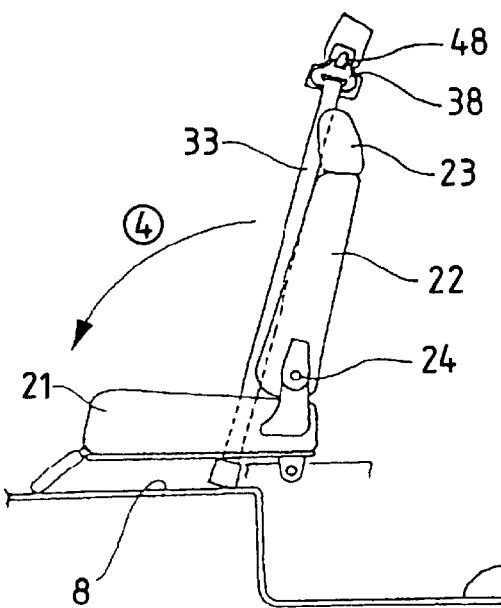
Figure 7B:
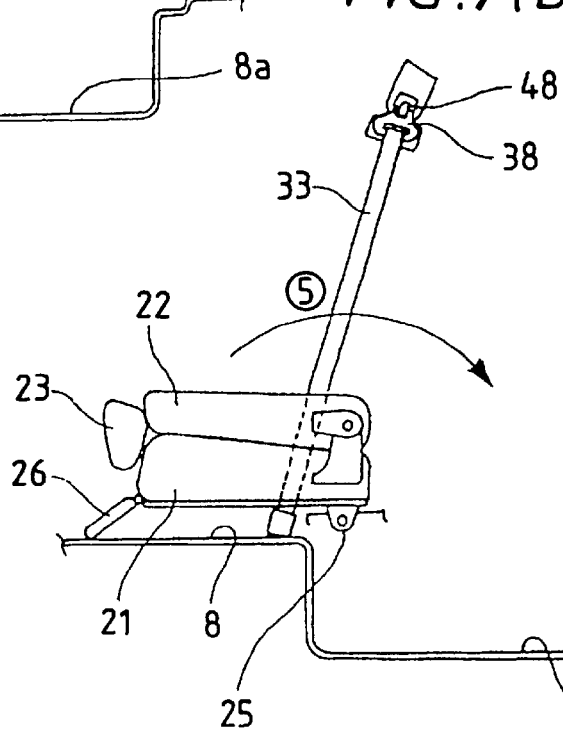
Figure 7C:
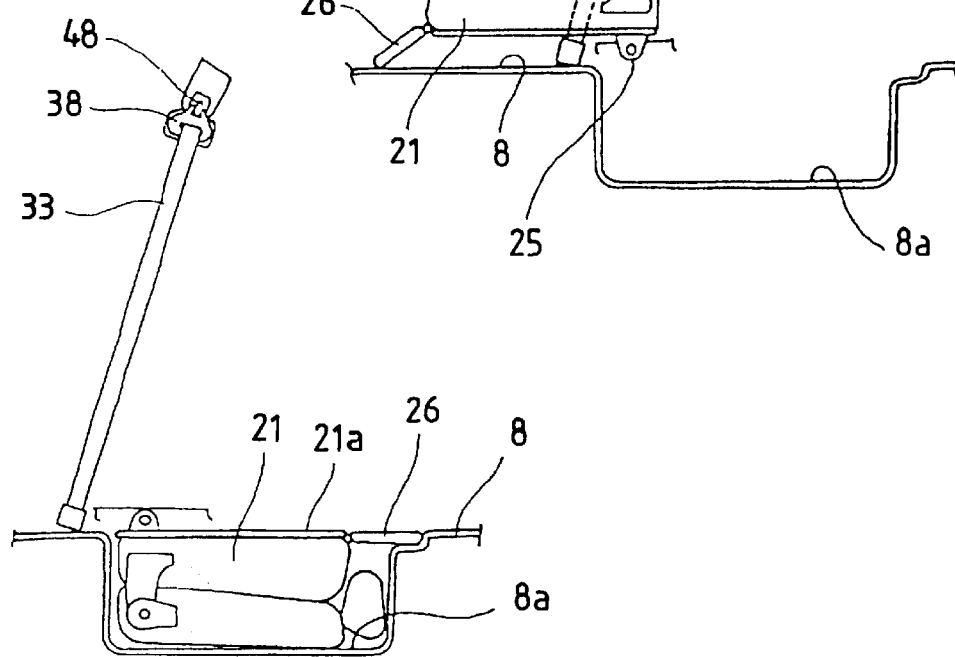

FIGS. 7(a) to 7(c) are diagrams showing fourth operation of the tongue hooking mechanism for a seat belt according to the present invention.

Referring to FIG. 7(a), the seat back 22 is folded around the rotational shaft 24 as indicated with an arrow (4). Simultaneously, also the headrest 23 is folded in synchronization with the seat back 22.

When the tongue 38 is hooked by the hook 48 and moved to a position above the headrest 23, the tongue 38 does not obstruct the seat back 22 and the headrest 23 attempted to be folded.

Referring to FIG. 7(b), the seat cushion 21 is, together with the seat back 22 and the headrest 23 and as indicated with an arrow (5), rotated around a pivot shaft 25 toward the receiving recess 8a formed in the rear portion.

Since the tongue 38 does not obstruct the operation, the seat cushion 21 can smoothly be rotated together with the seat back 22 and the headrest 23.

Referring to FIG. 7(c), a gap between the floor 8 and the seat cushion 21 is closed by a plate 26. At this time, each of the bottom surface 21a of the seat cushion 21 and the plate 26 is made to be flushed with the floor 8.

In the foregoing embodiment, the hook 48 for hooking the tongue 38 is provided for the cover 44 which covers the fixing member 42. The hook may be provided for the fixing member 42.

Although the foregoing embodiment has been described about the structure that the recess 46 for receiving the tongue 38 is formed in the cover 44, the recess 46 may be omitted from the cover 44.

Also the recess 46 formed in the cover 44 may be formed in the fixing member 42.

The foregoing embodiment has been described about the structure in which the pressing force T1 shown in FIG. 5(b) is outwards inclined by angle θ from the straight line 47 which is in parallel with the bottom surface 46b of the recess 46. The present invention is not limited to this. For example, the pressing force T1 may be exerted in parallel with the bottom surface 46b of the recess 46.

As a result, the pressing force T1 is able to reliably press the tongue 38 against the hook 48.

The present invention having the above-mentioned structure exhibits the following effects As described above, one aspect of the present invention has the structure that tension is applied to the seat belt by the retractor in a state in which the tongue is hooked by the hook. As a result, the possibility that the tongue is separated from the hook during running can be eliminated. Since vibrations of the tongue can be prevented, noise is not produced from vibrations. Therefore, the inside portion of the cabin can be maintained silent.

Since the tongue is not vibrated, durability can be improved.

Another aspect of the present invention has the structure that the recess for receiving the tongue is formed in the fixing member or the cover. Since the tongue is received in the recess, undesirably projection of the tongue into the inside portion of the cabin can be prevented. Therefore, the appearance in a state in which the tongue has been hooked can be enhanced.

Another aspect of the present invention has the structure that the upper wall portion which forms the recess is the slant downwardly extending from the central portion of the cabin toward the wall. As a result, guiding of the tongue to the hook and separation of the tongue from the hook are permitted along the slant upper wall portion. Therefore, attachment and detachment of the tongue can easily be performed.

Another aspect of the present invention has the structure that the lower end of the tongue is disposed upper than the lower end of the through anchor portion. Therefore, the tension of the seat belt is able to reliably press the tongue against the hook. As a result, the possibility that the tongue is separated from the hook during running can be eliminated. Since vibrations of the tongue can reliably be prevented, the inside portion of the cabin can be maintained silent.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A passenger restraint system comprising:
  a seat being rotatable around a rotation shaft extending along a width direction of a vehicle;
  a buckle disposed on a side of said seat adjacent to a central portion of a cabin of said vehicle;
  a seat belt having a fixed portion formed at a first end thereof and disposed on the wall of the cabin;
  a through anchor portion attached to an upper portion of the wall and arranged to support an intermediate portion of said seat belt;
  a retractor disposed below said through anchor portion and arranged to wind said seat belt at a second end thereof;
  a tongue having an opening joined to an intermediate portion of said seat belt which can be latched to said buckle so that the abdomen and the breast of an occupant are held; and
  a tongue hooking mechanism comprising a fixing structure for fixing said through anchor portion to the wall, a hook member for hooking said tongue while said seat belt is subjected to a tension force of said retractor and a housing for enclosing a portion of said through anchor and formed with said hook member, wherein said housing is configured for receiving and retaining said tongue against said housing when said hook is received through the opening of said tongue, said fixing structure constructed such that said through anchor portion is positioned below said hook member, wherein the lower end of said tongue is disposed at a position higher than the lower end of said through anchor portion in a state that said tongue is being hooked by said hook, to thereby urge the lower end of said tongue to said through anchor with the tension force of said retractor.

2. A tongue hooking mechanism for a seat belt according to claim 1, wherein said fixing structure comprises:

a recessed portion disposed around said hook member for receiving said tongue.

3. A tongue hooking mechanism for a seat belt according to claim 2, wherein said recessed portion comprises:

a guide wall portion inclined downwardly from the central portion to the outside of said cabin and extended along said wall.

4. A tongue hooking mechanism for a seat belt according to claim 1, wherein said fixing structure comprises:

a fixing member for fixing said through anchor portion to said wall, and a cover for covering said fixing member and on which said hook member is disposed.

5. A tongue hooking mechanism for a seat belt according to claims 4, wherein said cover comprises:

a recessed portion disposed around said hook member for receiving said tongue.

6. A tongue hooking mechanism for a seat belt according to claim 5. wherein said recessed portion comprises:

a guide wall portion inclined downwardly from the central portion to the outside of said cabin and extended along said wall.

7. A tongue hooking mechanism for a seat belt according to claim 1, wherein said hook member has a claw extending upwardly.

8. A passenger restraint system comprising:

a buckle disposed on a side of a seat adjacent to a central portion of a cabin of a vehicle;

a seat belt having a fixed portion formed at a first end thereof and disposed on the wall of the cabin;

a through anchor portion attached to an upper portion of the wall and arranged to support an intermediate portion of said seat belt;

a retractor disposed below said through anchor portion and arranged to wind said seat belt at a second end thereof;

a tongue having an opening joined to an intermediate portion of said seat belt which can be latched to said buckle so that the abdomen and the breast of an occupant are held; and a tongue hooking mechanism comprising a fixing structure for fixing said through anchor portion to the wall, a hook member for hooking said tongue while said seat belt is subjected to a tension force of said retractor and a housing for enclosing a portion of said through anchor and formed with said hook member, wherein said housing is configured for receiving and retaining said tongue against said housing when said hook is received through the opening of said tongue.

9. A passenger restraint system, comprising:

a seat of a vehicle;

a buckle disposed on a side of said seat adjacent to a central portion of a cabin of said vehicle;

a seat belt having a fixed portion formed at a first end thereof and disposed adjacent to a wall of the cabin;

a through anchor portion attached to an upper portion of the wall and arranged to support an intermediate portion of said seat belt;

a retractor disposed below said through anchor portion and arranged to wind said seat belt at a second end thereof;

a tongue having an opening joined to an intermediate portion of said seat belt which can be latched to said buckle so that the abdomen and the breast of an occupant are held; and a tongue hooking mechanism comprising a fixing structure for fixing said through anchor portion to the wall, a hook member for hooking said tongue while said seat belt is subjected to a tension force of said retractor and a housing for enclosing a portion of said through anchor and formed with said hook member, wherein said housing is configured for receiving and retaining said tongue against said housing when said hook is received through the opening of said tongue, said fixing structure constructed such that a lower end of said through anchor portion is formed so as to project toward the cabin side with respect to a bottom portion of said hook member, to thereby urge the upper end of said tongue to said hook in a state that said tongue is being moved forward to said hook, said fixing structure constructed such that said through anchor portion is positioned below said hook member, wherein the lower end of said tongue is disposed at a position higher than the lower end of said through anchor portion in a state that said tongue is being hooked by said hook to thereby urge the lower end of said tongue toward said through anchor portion with the tension force of said retractor.

10. The passenger restraint system according to claim 9, wherein said fixing structure is constructed such that the lower end of said tongue is positioned so as to project toward the cabin side with respect to a tongue main body to be latched with said buckle, in a state that said tongue is being moved forward toward said hook, to thereby urge said tongue to smoothly slide along the surface of said lower end of said through anchor portion.

11. A tongue hooking mechanism for a seat belt according to claim 10, wherein said recessed portion comprises:

a guide wall portion inclined downwardly from the central portion to the outside of said cabin and extended along said wall.

12. The passenger restraint system according to claim 9, wherein said seat belt has a fixed portion formed at a first end thereof and disposed on the wall of the cabin.

13. The passenger restraint system according to claim 9, wherein said seat belt is rotatable around a rotation shaft extending along a width direction of a vehicle.

14. A tongue hooking mechanism for a seat belt according to claim 9, wherein said fixing structure comprises:

a recessed portion disposed around said hook member for receiving said tongue.

15. A tongue hooking mechanism for a seat belt according to claim 9, wherein said fixing structure comprises:

a fixing member for fixing said through anchor portion to said wall, and a cover for covering said fixing member and on which said hook member is disposed.

16. A tongue hooking mechanism for a seat belt according to claim 15, wherein said cover comprises:

a recessed portion disposed around said hook member for receiving said tongue.

17. A tongue hooking mechanism for a seat belt according to claim 16, wherein said recessed portion comprises:
a guide wall portion inclined downwardly from the central portion to the outside of said cabin and extended along said wall.

18. A tongue hooking mechanism for a seat belt according to claim 9, wherein said hook member has a claw extending upwardly.

* * * * *